(12) United States Patent
Fitter

(10) Patent No.: US 6,427,732 B1
(45) Date of Patent: Aug. 6, 2002

(54) FILLER UNIT FOR AUTOMATICALLY TOPPING UP A CONTAINER WITH LIQUID

(76) Inventor: Johan Christiaan Fitter, 51 Mount Street, Bryanston, 2021, Johannesburg (ZA)

( * ) Notice: Subject to any disclaimer, the term of this patent is extended or adjusted under 35 U.S.C. 154(b) by 0 days.

(21) Appl. No.: 09/719,444

(22) PCT Filed: Jun. 9, 1999

(86) PCT No.: PCT/IB99/01065
§ 371 (c)(1),
(2), (4) Date: Feb. 5, 2001

(87) PCT Pub. No.: WO99/65094
PCT Pub. Date: Dec. 16, 1999

(30) Foreign Application Priority Data

Jun. 12, 1998 (ZA) ............................................... 98/5131

(51) Int. Cl.[7] ................................................. B65B 1/04
(52) U.S. Cl. ............................ 141/95; 141/31; 141/310
(58) Field of Search ........................... 141/31, 95, 198, 141/35, 36, 286, 310

(56) References Cited

U.S. PATENT DOCUMENTS 4,007,764 A * 2/1977 Bandemor
4,544,004 A   10/1985 Fitter et al.
4,549,952 A * 10/1985 Columbus

* cited by examiner

Primary Examiner—Steven O. Douglas
(74) Attorney, Agent, or Firm—Alston & Bird LLP

(57) ABSTRACT

A filler unit for automatically topping up a battery cell (14) includes a float vessel (16) for containing the liquid to be dispensed and a float valve assembly (34) for establishing a predetermined substantially constant head of liquid in the vessel (16). A baffle plate (40A) in the vessel (16) is spaced sufficiently close to a wall of the vessel (16) to define a capillary passage between the wall and the baffle plate (40A), with at least that surface of the baffle plate (40A) which defines the capillary passage being hydrophilic. In use, the replenishment water is able to flow from the vessel (16) to the cell (14) under gravity along a flowpath until such time as the water level in the cell (14) has risen to a desired level. This creates a pressure equilibrium in the flowpath which causes the flow from the vessel (16) to the cell (14) to cease automatically.

12 Claims, 2 Drawing Sheets

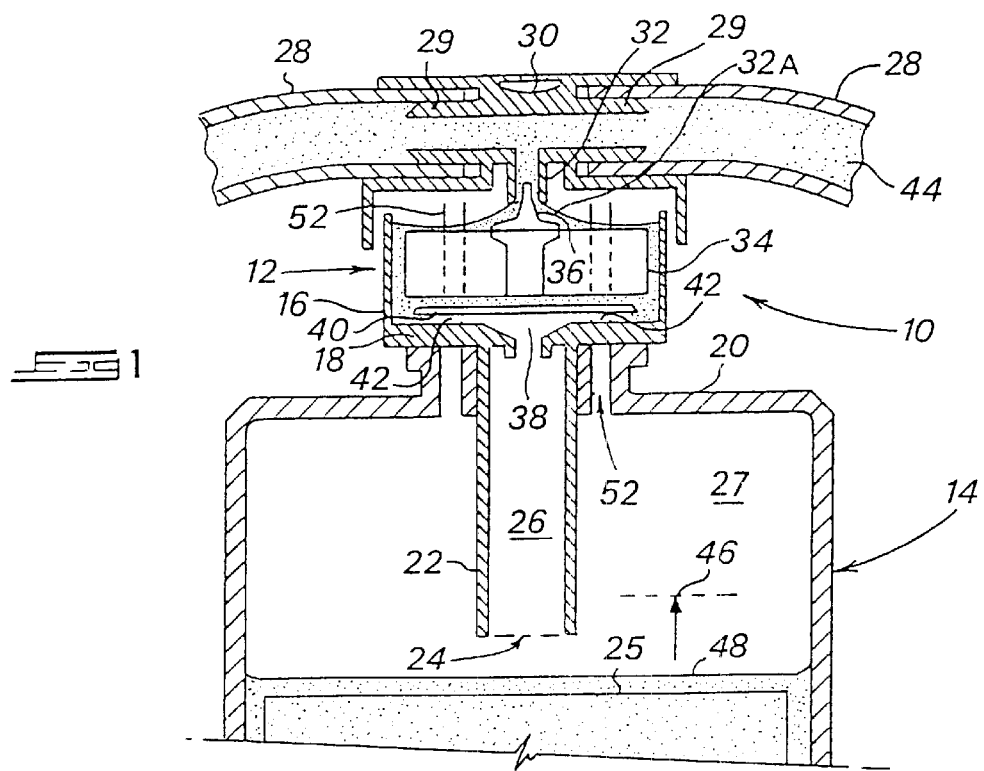
_FIG_1
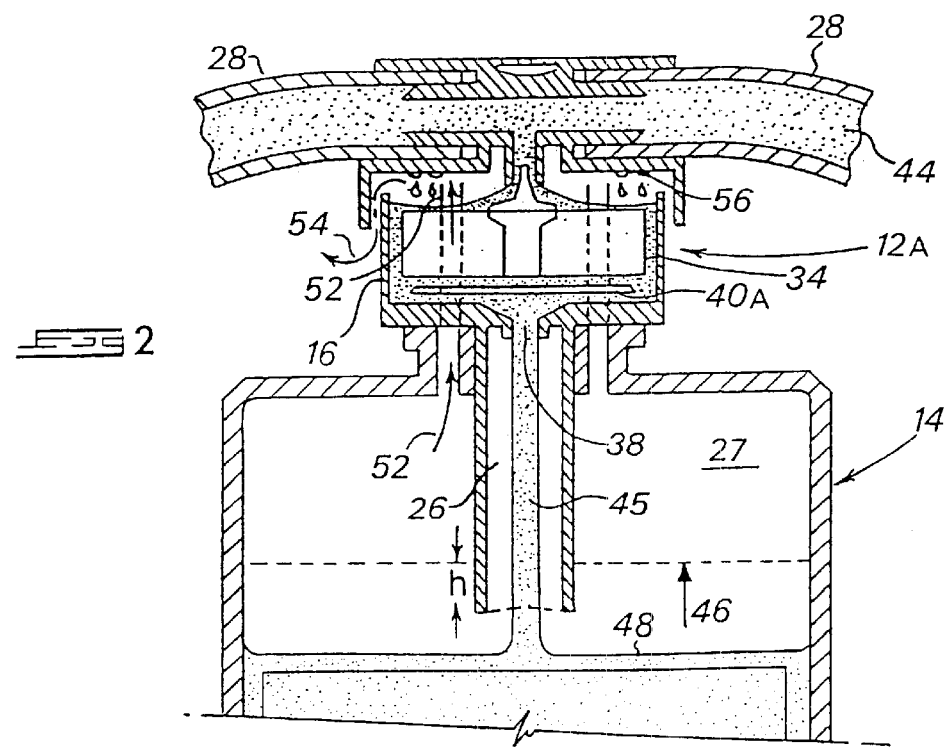
_FIG_2

FILLER UNIT FOR AUTOMATICALLY TOPPING UP A CONTAINER WITH LIQUID

BACKGROUND OF THE INVENTION

This invention relates to a filler unit for automatically topping up a container with liquid, and in particular to a battery filler unit for automatically topping up battery cells with electrolyte in the form of purified water to compensate for losses due to electrolysis and evaporation.

One such battery filler unit consists of a vessel which may be positioned immediately above a battery cell and supplied with water in a manner which maintains a constant head in the vessel. An orifice in the bottom of the vessel communicates with a downpipe which extends downwards from the orifice into the top portion of the cell. Water flows from the vessel to the cell under gravity along a flow path defined by the orifice and the downpipe thereby adding to the electrolyte and causing the level of the electrolyte to rise progressively until the lower end of the downpipe becomes submerged below the level of the electrolyte.

The orifice forms a continuous air seal by action of surface tension in the water being dispensed. As the lower end of the downpipe becomes submerged, air in the downpipe becomes trapped, and a condition is set up for pressure equilibrium in the flow path causing flow from the vessel to the cell to cease.

In one improvement of a battery filler unit a baffle plate is introduced and spaced close to the bottom of the vessel to form a capillary passage which operates in tandem with the orifice to improve the quality of the seal at the head of the downpipe. This improvement forms the subject of U.S. Pat. No. 4,544,044. Resistance to the flow of water under the baffle plate is known to be dependent on the physical dimensions underneath the baffle plate. Problems can sometimes arise when these surface characteristics undergo variations sufficient to interfere with the correct flow of the replenishment water. One method which has been used to help alleviate the problem has been to vary the clearance between adjacent faces formed by the bottom of the vessel and the lower surface of the baffle plate appropriately so as to preserve the requisite flow rate.

An obvious disadvantage of this measure is that the capillarity diminishes with increased spacing, leading to a corresponding sacrifice in the efficacy of the airseal with an increase in through flow and uneven filling of the cells of a multi-celled battery.

SUMMARY OF THE INVENTION

According to the invention there is provided a filler unit for use in dispensing a liquid into a container to top up the container to a predetermined desired level, the container being divided by level sensing means into a first pressurizable chamber and a second vented chamber, and the filler unit including a vessel for containing the liquid to be dispensed, means for establishing a predetermined substantially constant head of liquid in the vessel, an outlet orifice defined in the wall of the vessel, a baffle in the vessel spaced sufficiently close to the wall to define a capillary passage between the wall and the baffle, wherein the outlet orifice communicates directly with the pressurizable chamber, with at least that surface of the baffle which defines the capillary passage being hydrophilic, the unit being intended for iocation relative to the container, such that in use the liquid is able to flow from the vessel to the container under gravity along a flowpath having a hydrophilic portion defined by the capillary passage and the orifice into the pressurizable chamber until such time as the liquid level in the container has risen to the desired level within the lower end of the pressurizable chamber to trap air therein, thereby to create a pressure equilibrium in the flowpath which causes the flow from the vessel to the container to cease automatically.

In a preferred form of the invention, the level sensing means comprises a downpipe which terminates short of the base of the container and defines the first pressurizable chamber and divides the container into the first and second chambers, and the orifice is formed in a base wall of the vessel, with the downpipe extending downwardly from the orifice.

Advantageously, at least the capillary passage-defining surface of the baffle plate is hydrophilic by virtue of it being subjected to a surface treatment which serves to increase the wettability thereof.

By the term "hydrophilic" is meant that the capillary passage is capable of establishing the flowpath within a period of time not exceeding 15 seconds, wherein the capillary passage is substantially dry prior to the establishment of the flowpath.

Typically, the various components making up the filler unit, and in particular the baffle plate and the vessel, are injection moulded from a plastics material, such as polypropylene, with the resultant surface of the components having a gloss finish which is inherently hydrophobic, the baffle plate being hydrophilic by virtue of it being subjected to a surface treatment which serves to increase the wettability thereof.

The surface treatment may include the step of coating at least the operatively lower surface of the baffle plate with a hydrophilic substance, with the coating being sufficiently insoluble to withstand at least initial contact with condensate from the container, which in the case of a lead-acid battery, includes dilute sulphuric acid.

The hydrophilic substance typically includes group II metal salts, which are preferably a calcium and/or a magnesium salt such as calcium magnesium carbonate, and which are functionally insoluble in dilute sulphuric or battery acid.

More typically, the salts are chosen from the group comprising calcium carbonate, calcium hydroxide and calcium magnesium carbonate, or dolomite ($CaMg(CO_3)_2$).

Other possible hydrophilic substances or wetting agents include calcium chloride, calcium hypochlorite, and magnesium hydroxide, although the wetting effect in respect of these agents is in most cases reduced as they are functionally neutralized in respect of wetting effect in diluted sulphuric or battery acid.

In an alternative form of the invention, the plastics material from which the baffle plate is injection moulded is pre-mixed with a predetermined quantity of a granular filler which may be a finely divided suspended filler which is exposed on the operatively lower surface of the baffle plate.

Conveniently, the injection moulded baffle plate is subsequently treated with an acid so as to dissolve the exposed filler on the operatively lower surface of the plate, thereby defining pockets which provide a wettable surface. This surface may then be treated with a suitable surfactant such as a detergent or sodium bisulphate to encourage the wetting process.

The filler is preferably a group II metal salt. More preferably, the group II metal salt is soluble in hydrochloric acid, and may be in the form of calcium magnesium carbonate.

The surface treatment may also be achieved by surface oxidization of the injection moulded plastics components.

Physical surface-altering treatments such as flame or corona treatment may also be used.

BRIEF DESCRIPTION OF THE DRAWINGS

FIG. 1 shows a cross-sectional side view of a prior art filler unit in use on a battery cell in which flow has progressed partly through the filler unit, FIG. 2 shows a cross-sectional side view of a filler unit of the invention in use on a battery cell in which flow is proceeding normally into the cell.

DESCRIPTION OF EMBODIMENTS

Figure 3:
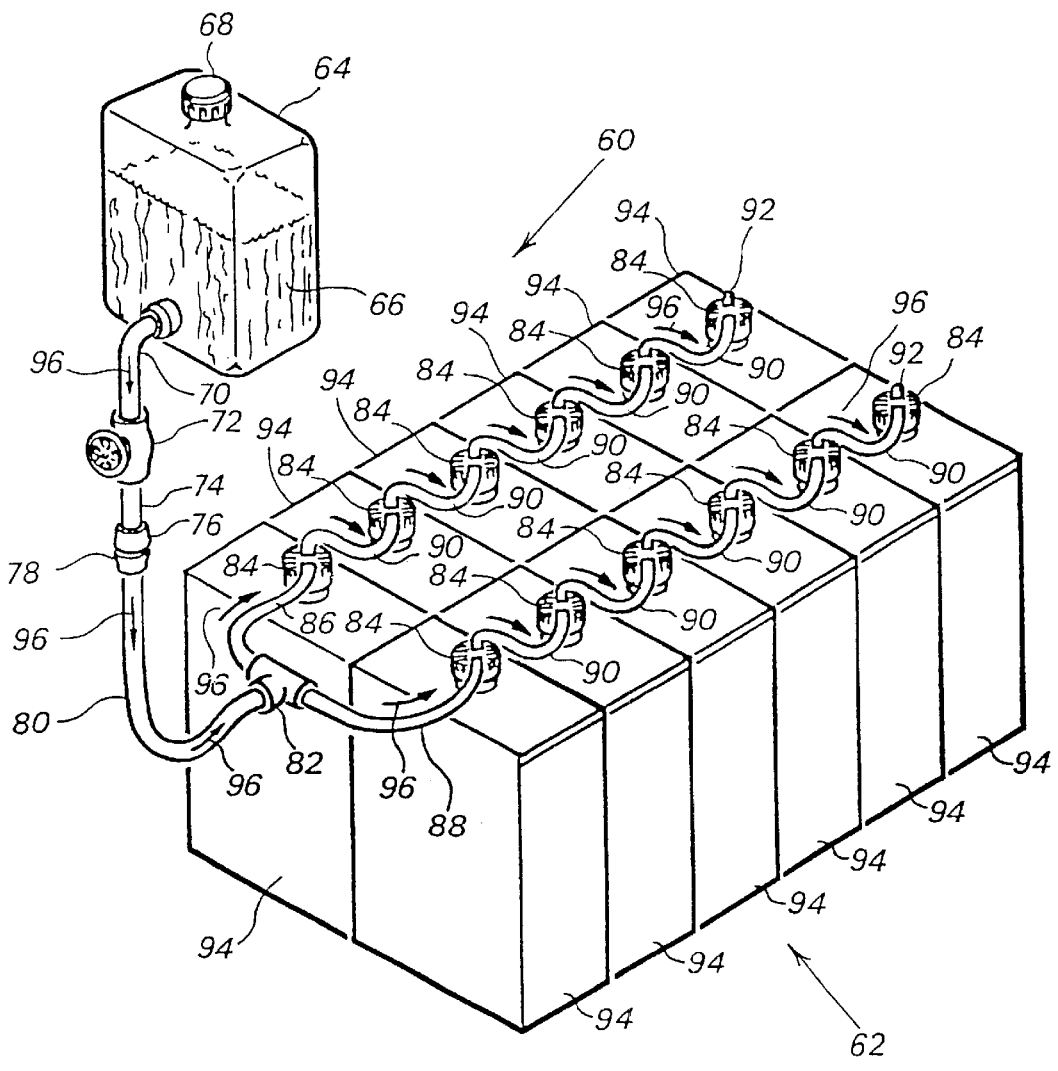
FIG. 3 shows a perspective view of a set of filler units of the invention installed on a multi-cell battery connected to facilitate a filling operation.

The battery cell filling arrangement 10 of FIG. 1 comprises a filler unit 12 located uppermost in a battery cell 14. The filler unit 12 includes a float vessel 16 having a base 18 positioned on top of a battery lid 20 of the battery cell 14. A downpipe or level sensing pipe 22 extends into the interior of the cell, and has a lowermost opening 24 which is positioned a suitable distance away from a plate assembly 25, to divide the cell into a pressurizable chamber 26 within the downpipe and a non-pressurizable chamber 27 surrounding the downpipe and venting to atmosphere.

The filler unit 12 further comprises a water feed arrangement including a pair of feed tubes 28 coupled to opposed spigot arms 29 of a T-duct 30, the central vertical duct 32 of which delivers replenishment water to the float vessel 16. A float valve assembly 34 is located within the float vessel 16 for providing a predetermined substantially constant head therein. The float carries a central pin valve 36 adapted to mate with a valve seat 32A defined at the lowermost opening of the central duct 32.

A central outlet 38 is defined in the base 18 at the head of the downpipe 22, and a disc-shaped injection moulded baffle plate 40 is located immediately above the base 18 so as to define a capillary passage 42 which progressively broadens in cross-section from the outer periphery of the baffle plate 40 towards the central orifice 38. Replenishment water enters the feed tubes 28 via a suitable pressurized water feed arrangement and passes through the central duct 32, the valve 36, and around and directly beneath the float valve assembly 34, causing it to float upwardly within the float vessel 16.

During normal operation, and as is clear from FIG. 2, the replenishment water flows inwardly through the capillary passage 42 into the mouth of the orifice 38, where it provides an air seal at the head of the downpipe 22 through action of the surface tension in the replenishment water 44. The water flows into the battery cell 14 along a filamentary flow path 45 which lies substantially along the central axis of the downpipe 22 and into the battery cell 14 to raise the electrolyte level to a level indicated at 46. The lower opening 24 in the downpipe becomes sealed as the electrolyte or water in the battery cell 14 is replenished. The air pressure within the downpipe 22 rises progressively by virtue of the head "h" as the level 46 of water is approached. The increase in air pressure shuts off the flow of water through the orifice 38 and capillary passage 42. This in turns raises the water level in the float vessel, and results in the valve 36 mating with the valve seat 32A and closing off the flow of replenishment water into the filler unit at the central duct 32 as the float valve assembly 34 rises.

During the battery charging process, various released gases pass through the filler unit 12 via venting ducts 52 where the liquid fraction of the spray or mist forms a condensate 56, with the gaseous discharge exiting via the path 54. The condensate then flows across the upper surface of the float and downwardly into the capillary passage 42. A portion of the liquid condensate trickles back into the battery cell 14 via the central orifice 38, whilst the remainder is retained within the confines of the filler unit 12. The condensate thus provides progressive wetting of the walls of the capillary passage constituted by the underside of the baffle plate 40 and the upper surface of the base 18 of the vessel.

The filler unit of FIG. 1 is assembled from components formed in a conventional plastics injection moulding process, as a result of which the flow of replenishment water 44 will proceed up until the FIG. 1 stage, where it just reaches the entrances of the capillary passage 42. This tends to occur in particular when the filler unit has just been installed, and is dry. The reason for this is that the injection moulded plastic surfaces tend to be hydrophobic, or non-wetting, which means that non-pressurized flow through the capillary passage 42 does not normally occur. The only way of inducing flow under these conditions is to increase the spacing within the capillary passage. This would have the resultant effect of reducing or even nullifying the capillarity of the passage 42, thereby seriously compromising the progressive air seal which the capillary passage provides, leading to possible overtopping.

It has been found that this problem can be addressed by altering surface wetting characteristics of the hydrophobic plastic material from which the baffle plate is formed.

The surface wetting characteristics of certain plastics, such as ABS plastics, can be temporarily enhanced by the application of surfactants such as domestic detergents. The wetting characteristics of these detergents are not always satisfactory when applied to other more economically produced plastics such as polypropylene, of which lasting wettability can be particularly difficult to achieve in the short term without additional treatment. In one form of the invention, the polypropylene plastic from which the baffle plate 40A is injection moulded is supplemented as follows.

When manufacturing a master batch of plastics material for injection moulding the baffle plate component, calcium magnesium carbonate is mixed with polypropylene plastic so that there is an even dispersion throughout the body of the suspended calcium magnesium carbonate, with a suitable density appearing near the surface thereof. The procedure typically used is to mix a 40% calcium carbonate-filled polypropylene "modified plastic" or "modified polypropylene", which is purchased from the supplier, with pure polypropylene in the required ratio to obtain, say, 8% of calcium carbonate by mass. The modified plastic is formulated in a complicated extrusion process, but once suspended in plastic, further dilution can be performed by the moulder simply by mixing the required ratio of pure polypropylene.

The particles at the surface interface are optionally dissolved by immersing the injection moulded product in hydrochloric acid for a suitable period of time. Alternatively, the particles may be dissolved naturally by extended exposure to acidic electrolyte after installation and subsequent to commencement of operation on a container such as a battery. Dissolution of the surface-based calcium carbonate particles gives rise to a corresponding number of tiny pockets, thereby making it wettable and promoting capillarity. The surface is not merely allowed to dry, as it would be difficult to revitalize the wetting properties merely by adding water. For this reason, a small quantity of detergent and sodium bisulphate is applied to the surface before it is allowed to dry.

Other methods of providing capillarity include treatment with surfactants such as calcium chloride, calcium hypochlorite and magnesium hydroxide. The wetting effect is, in most cases, seriously reduced when the component is then brought into contact with diluted sulphuric acid, which is typically present in the condensate, or the sodium bisulphate which is applied to the surface.

An improved method of treatment is to immerse the injection moulded polypropylene baffle plate component in a slurry of finely divided calcium magnesium carbonate, and boiling the component for ten minutes within the slurry. The component then becomes covered with a thin layer of calcium and/or magnesium salt which bonds to the polypropylene surface. Whilst not strong enough to withstand rough handling, the coating provides an effective wetting agent and promotes capillarity when applied to the baffle plate 40A and the base of the valve vessel 16. The coating generally remains effective when brought into contact with diluted sulphuric acid and sodium bisulphate of the type typically encountered.

With reference to FIG. 2, the filler unit 12A has been assembled from components taken directly from an injection moulding process, except the baffle plate 40A which is boiled in a calcium magnesium carbonate slurry prior to assembly. The baffle plate optionally contains between zero and 40% of calcium magnesium carbonate. When first brought into service under conditions in which pre-wetting of the capillary passage has not occurred, the flow of replenishment water 44 will proceed into the capillary passage 42, even though it may be a narrow passage, virtually immediately or with a minimal period of delay, and will thereafter advance via the orifice 38 into the cell 14 within a period not exceeding 15 seconds. The air seal provided by the baffle plate 40A in this arrangement is excellent, notwithstanding that only the plate 40A is wetting, whilst the surface of the base 18 of the vessel 16 need only be partially or even non-wetting.

Upon permanent installation on the battery cell 14, the filler unit 12A is subjected to periodic ingress of electrolyte mist or spray, forming condensate 56, as was previously outlined. Some of the condensate 56 is returned to the cell 14 via the capillary passage 42, whilst a small portion is retained on the surface of the baffle plate 40A, assisted to some extent by the presence of calcium and/or magnesium salts which adhere to the plastics material surface of the baffle plate 40. This results, over an extended period of time, (weeks to months), in corrosive penetration of the condensate into the outer surface of the baffle plate 40, thereby naturally enhancing the wettability thereof.

Generally, after the condensate 56 has commenced wetting of the surface of the baffle plate 40, it will sustain wetting even if the filling and coating provided by the treatment process is consumed or lost.

Wetting can optionally be promoted by means of surface oxidization of the various plastics materials components, through brief application of a suitably adjusted flame, or by corona discharge treatment, or by a variety of other processes which nullify the naturally hydrophobic characteristic of specified injection moulded plastics materials, to turn them into hydrophilic characteristics.

In the case of battery filler usage, it should be borne in mind that these processes may introduce substances onto the surfaces of the plastics materials components which may interfere with the proper operation of the battery cells, and these must therefore be avoided. For example, the use of calcium/magnesium carbonate, sodium bisulphate and detergents, in the small quantities employed, is not incompatible with the proper operation of lead-acid batteries. On the other hand, the use of chlorides, even in small quantities, is not compatible with the proper operation of lead-acid batteries.

FIG. 3 illustrates a single point battery filling system 60 installed on a twelve cell battery 62, in which the filler units 84 correspond to the filler unit 12 of FIG. 1, and 12A of FIG. 2. The filling system 60 is shown connected to facilitate a filling operation, the filling system 60 including a water reservoir 64 positioned above the twelve cell battery 62 to permit at least a portion of the water volume 66 to flow by gravity to the filler units 84. While flow by gravity is a preferred method for bringing replenishment water to the filler units 84, any form of pressurisation of the water sufficient to provide flow into the filler units 84 can be used.

The water reservoir 64 has an outlet tube 70 connected to a control valve 72, which is in turn connected, by another length of tube 74, to a disconnectable coupling comprising an upper section 76 and a lower section 78. The upper section 76 and the lower section 78 may be parted by an operator in attendance and reconnected when required.

The lower section 78 of the disconnectable coupling connects to a tee 82 via another length of tube 80. The tee 82 connects to two similar banks comprising six filler units 84 interconnected by five stub tubes 90, and terminated by a stopper 92.

A filling procedure is initiated by connecting the upper section 76 to the lower section 78 of the disconnectable coupling and by opening the control valve 72. Provided there is a sufficient volume of water 66 in the reservoir 64, water will flow from the reservoir 64 to the filler units 84 and into the cells 94 of the battery 62 to replenish any water lost from the electrolyte within the cells through normal use of the battery 62.

The volume of water 66 within the reservoir 64 is maintained by adding sufficient water to the reservoir via an access port 68. Water may be added at intervals or continuously to the reservoir 64 from a suitable source of supply.

The filling procedure is terminated by closing the control valve 72. The disconnectable coupling may be opened immediately or after a suitable period of time determined by the operator in attendance, by parting the upper section 76 from the lower section 78. Any continuous inflow of water to the reservoir 64 is typically interrupted when the volume of water 66 in the reservoir 64 begins to exceed a predetermined amount after the outflow has been stopped.

The disconnectable coupling comprising upper section 76 and lower section 78 may be of a type which provides automatic closure of their respective flow paths upon disconnection, and automatic opening upon connection, thereby assisting in minimising or even eliminating any water spillage.

Upon initiation of the filling procedure a portion of the water volume 66 runs along the flow paths defined by the tubes in the direction indicated by the arrows 96, filling the entire flow path from the reservoir outlet tube 70 to the stoppers 92 with water. The tubes 86, 88 and 90 and stoppers 92 correspond to the feed tubes 28 defined in FIG. 1, and therefore replenishment water will begin to flow into the respective float vessels 16 of the respective filler units 12.

The twelve battery cells 94 correspond to twelve containers, each equivalent to the container 14 shown in FIG. 1, and therefore replenishment water will be ready to flow into the twelve battery cells 94.

If the filler units 84 are assembled from components formed in a conventional plastics injection moulding process the flow of replenishment water into the battery cells 94 may be subject to some delay due to the hydrophobic nature of the capillary passage 42 as illustrated in FIG. 1. However, if the filler units 84 are assembled from components including a baffle plate 40A which has been suitably treated to make its surface hydrophilic, the flow of replenishment water will proceed almost without any delay.

A delay as may be experienced through the use of untreated components will in no way reduce the usefulness of the filling system in normal application, but can prove inconvenient when attempting to reduce the filling time period by terminating the filling procedure earlier such as in a situation where the operator has available a limited period of time to attend to a series of filling systems in a multi-system installation.

There will always be a varying degree of hydrophilic/hydrophobic reaction within a range of examples of typical filler units. It is therefore unlikely that two or more units on a given battery will have identical characteristics. It is self-evident, therefore, that any attempt to reduce filling time by simply disconnecting the water earlier will result in the filling rates of the individual battery cells 94 of battery 62 not being equal.

This variation in hydrophilic/hydrophobic reaction is almost entirely neutralised if all twelve filler units 84 are assembled from components including a baffle plate 40A which has been suitably treated to make its surface hydrophilic.

The invention extends to the use of filler units having multiple level sensing pipes or other level sensing arrangements which divide the cell into pressurizable and non-pressurizable chambers.

What is claimed is:

1. A filler unit adapted for use in dispensing a liquid into a container having a base to top up the container to a predetermined desired level, the filler unit including a vessel for containing the liquid to be dispensed, means for establishing a predetermined substantially constant head of liquid in the vessel, an outlet orifice defined in a wall of the vessel, a baffle in the vessel spaced apart from the wall to define a capillary passage between the wall and a surface of the baffle, and a level sensing means for dividing the container into a pressurizable chamber and a vented chamber, wherein the outlet orifice communicates directly with the pressurizable chamber, with at least the surface of the baffle which defines the capillary passage being hydrophilic, the filler unit being intended for location relative to the container, such that in use the liquid is able to flow from the vessel to the container under gravity along a flowpath having a hydrophilic portion defined by the capillary passage and the orifice into the pressurizable chamber until such time as the liquid level in the container has risen to the desired level within the lower end of the pressurizable chamber to trap air therein, thereby creating a pressure equilibrium in the flow-path which causes the flow from the vessel to the container to cease automatically.

2. A filler unit according to claim 1 in which the level sensing means comprises a downpipe which terminates short of the base of the container and defines the pressurizable chamber and divides the container into the pressurizable and vented chambers, and the orifice is formed in the wall of the vessel, with the downpipe extending downwardly from the orifice.

3. A filler unit according to claim 1 in which at least the capillary passage-defining surface of the baffle is made hydrophilic by a surface treatment capable of increasing the wettability thereof.

4. A filler unit according to claim 3 in which the surface treatment includes the step of applying to at least the capillary passage-defining surface of the baffle, a coating of a hydrophilic substance capable of withstanding at least initial contact with corrosive condensate from the container.

5. A filler unit according to claim 4 in which the hydrophilic substance is a group II metal salt.

6. A filler unit according to claim 5 in which the group II metal salt is chosen from the group consisting of a calcium salt, a magnesium salt, and combinations thereof.

7. A filler unit according to claim 6 in which the group II metal salt is chosen form the group consisting of calcium carbonate, calcium hydroxide and calcium magnesium carbonate, or dolomite ($CaMg(CO_3)_2$).

8. A filler unit according to claim 1 in which the baffle is formed from a plastics material which is premixed with a predetermined quantity of a granular filler.

9. A filler unit according to claim 8 in which the granular filler is a group II metal salt.

10. A filler unit according to claim 9 in which the baffle is injection molded and subsequently treated with an acid so as to dissolve any exposed filler on at least the capillary passage-defining surface of the baffle, thereby defining pockets which provide a wettable surface.

11. A filler unit according to claim 10 in which the capillary passage-defining surface is then treated with a surfactant capable of encouraging the wetting process.

12. A filler unit according to claim 1 in which the baffle is injection molded from a plastics material, and the capillary passage-defining surface is made hydrophilic by a treatment selected from the group consisting of a surface oxidation treatment, a flame treatment, and a corona treatment.

\* \* \* \* \*